United States Patent
Ning et al.

(10) Patent No.: US 12,527,297 B1
(45) Date of Patent: Jan. 20, 2026

(54) ANIMAL GAIT ANALYSIS APPARATUS AND METHOD

(71) Applicant: Mi Zhou, Chongqing (CN)

(72) Inventors: Guangzhi Ning, Tianjin (CN); Mi Zhou, Chongqing (CN); Hao Zhong, Tianjin (CN); Song Liu, Tianjin (CN); Hongjiang Yang, Tianjin (CN); Cong Xing, Tianjin (CN); Bo Li, Tianjin (CN); Hongda Wang, Tianjin (CN); Hongpeng Ma, Tianjin (CN); Jian Wang, Tianjin (CN); Junrui Guo, Tianjin (CN); Qi Zhang, Tianjin (CN)

(73) Assignee: Guangzhi Ning, Tianjin (CN)

( * ) Notice: Subject to any disclaimer, the term of this patent is extended or adjusted under 35 U.S.C. 154(b) by 0 days.

(21) Appl. No.: 19/274,829

(22) Filed: Jul. 21, 2025

(30) Foreign Application Priority Data

Jun. 13, 2025 (CN) .......................... 202510811721.9

(51) Int. Cl.
*A01K 1/03* (2006.01)
*A01K 15/02* (2006.01)

(52) U.S. Cl.
CPC ........ *A01K 1/0317* (2025.08); *A01K 15/0203* (2025.08)

(58) Field of Classification Search
CPC ...... A01K 1/031; A01K 1/0317; A01K 15/02; A01K 15/0203; A01K 15/027; A01K 15/0275; A01K 29/005
USPC ....................................................... 119/421
See application file for complete search history.

(56) References Cited

U.S. PATENT DOCUMENTS

| | | | |
|---|---|---|---|
| 11,406,282 B2 * | 8/2022 | Tasch ................... | A61B 5/1036 |
| 2003/0024482 A1 * | 2/2003 | Gondhalekar ....... | A01K 29/005 |
| | | | 119/422 |
| 2003/0055362 A1 * | 3/2003 | Hampton ............. | A61B 5/1038 |
| | | | 600/595 |

(Continued)

FOREIGN PATENT DOCUMENTS

| | | | | |
|---|---|---|---|---|
| CN | 108651319 A | * | 10/2018 | .......... A01K 29/005 |
| CN | 212415732 U | | 1/2021 | |

(Continued)

OTHER PUBLICATIONS

Lucas Noldus, "CatWalk XT", Dec. 15, 2024, YouTube; https://www.youtube.com/watch?v=AHI-hiwICH4 (Year: 2024).*

*Primary Examiner* — Kimberly S Berona
*Assistant Examiner* — Erica Michelle Huebner
(74) *Attorney, Agent, or Firm* — Nitin Kaushik

(57) ABSTRACT

An animal gait analysis is provided and includes a testing platform, a plurality of footprint signal modules mechanically connectable end-to-end and electrically connectable to form a walking path of a predetermined configuration, a testing enclosure disposed above the walking path, and a control device electrically connected to the footprint signal modules, wherein the testing enclosure comprises at least two side panels disposed opposite each other, at least one obstacle, and at least one movable partition, the spacing between the side panels is automatically adjusted by a drive mechanism to accommodate test objects of different body types, the obstacle is selectively connected to a surface of the footprint signal modules, and the movable partition is selectively connected to a surface of the footprint signal modules.

8 Claims, 6 Drawing Sheets

(56) References Cited

U.S. PATENT DOCUMENTS

| | | | | |
|---|---|---|---|---|
| 2007/0236356 A1* | 10/2007 | Zhang | ................... | A01K 1/031 |
| | | | | 340/573.2 |
| 2010/0056960 A1* | 3/2010 | Lanny | ................... | A61B 5/112 |
| | | | | 600/592 |
| 2012/0316797 A1* | 12/2012 | Ratzlaff | ............... | A01K 29/005 |
| | | | | 702/41 |
| 2013/0018282 A1* | 1/2013 | Mainini | ............... | A61B 5/1036 |
| | | | | 600/592 |
| 2014/0116347 A1* | 5/2014 | Casto | ...................... | A01K 1/03 |
| | | | | 119/474 |
| 2015/0122194 A1* | 5/2015 | De La Rosa | .......... | A01K 1/035 |
| | | | | 335/205 |
| 2017/0064929 A1* | 3/2017 | Yakovenko | ............ | A01K 1/031 |
| 2019/0008115 A1* | 1/2019 | Coker | .................. | A01K 1/0029 |

FOREIGN PATENT DOCUMENTS

| | | |
|---|---|---|
| CN | 118717102 A | 10/2024 |
| CN | 119606367 A | 3/2025 |

\* cited by examiner

ANIMAL GAIT ANALYSIS APPARATUS AND METHOD

CROSS-REFERENCE TO RELATED APPLICATIONS

This application claims priority to Chinese Patent Application No. 202510811721.9, filed Jun. 13, 2025, which is entirely incorporated herein by reference.

TECHNICAL FIELD

This application relates to the field of animal behavior analysis, and specifically relates to an animal gait analysis apparatus and method.

BACKGROUND

Animal gait analysis is a crucial tool in research fields such as ethology, neuroscience, and pharmacology, providing critical data for understanding animal locomotion patterns, evaluating nervous system function, and investigating the effects of drugs on motor behavior. Traditional gait analysis methods, such as those based on manual observation or ordinary video recording, are highly subjective, inefficient, and difficult to perform precise quantitative analysis.

To improve the objectivity and precision of analysis, researchers have developed various gait analysis devices. Among these, systems based on optical refraction principles (e.g., the CatWalk™ system) are commonly used. Such systems typically comprise light-emitting elements, a total internal reflection glass plate, and high-speed cameras. When an animal's foot contacts the glass plate, it disrupts the total internal reflection condition of light, causing refracted light to be captured by the camera and form footprints. However, these systems are sensitive to ambient light and easily disturbed, and the glass plates are cumbersome to clean and maintain. Furthermore, the dimensions and shape of their walking channels are typically fixed, making it challenging to accommodate animals of varying body types or specific experimental designs. Additionally, system upgrades and customization can also be difficult.

Another common technology is based on pressure sensor systems, which detect foot pressure distribution and contact time by laying out an array of pressure sensors on the walking path. While these systems can provide pressure information, the spatial resolution and dynamic range of the sensors may limit their ability to capture fine gait features in small animals. Additionally, they are often expensive and, similar to optical systems, suffer from a lack of modularity and poor adaptability.

Existing animal gait analysis devices still have room for improvement in terms of modular design, scalability, ease of maintenance, and signal acquisition accuracy in specific scenarios. For example, when experiments require conducting tests on animals of different body types (e.g., from mice to rats or even rabbits), changing or adjusting the walking platform and sensing area is often not flexible or convenient enough. If a sensing plate is damaged, the overall replacement cost is high, and localized repair is a complex process. Moreover, existing sensing platforms with fixed dimensions cannot easily meet the demand for constructing specially shaped or longer walking paths.

Therefore, there is a significant practical significance and application value in developing an animal gait analysis apparatus that is structurally flexible, easy to maintain and upgrade, capable of accurately acquiring gait signals, and adaptable to different experimental needs.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended to limit the scope of the claimed subject matter.

In an aspect, an animal gait analysis apparatus is provided, comprising:
  a testing platform;
  a plurality of footprint signal modules mechanically connectable end-to-end and electrically connectable to form a walking path of a predetermined configuration;
  a testing enclosure disposed above the walking path, the testing enclosure comprises at least two side panels disposed opposite each other, at least one obstacle, and at least one movable partition, wherein the spacing between the side panels is automatically adjusted by a drive mechanism to accommodate test objects of different body types, the obstacle is selectively connected to a surface of the footprint signal modules, and the movable partition is selectively connected to a surface of the footprint signal modules; and
  a control device electrically connected to the footprint signal modules, the drive mechanism, the obstacle, and the movable partition, respectively, is configured to:
  receive signals acquired from the footprint signal modules;
  control the spacing between the side panels, the state of the obstacle, and the state of the movable partition based on the received signals; and
  obtain animal gait analysis results.

In another aspect, an animal gait analysis method is provided, applied in an animal gait analysis apparatus comprising:
  a testing platform;
  a plurality of footprint signal modules mechanically connectable end-to-end and electrically connectable to form a walking path of a predetermined configuration;
  a testing enclosure disposed above the walking path, the testing enclosure comprises at least two side panels disposed opposite each other, at least one obstacle, and at least one movable partition, wherein the spacing between the side panels is automatically adjusted by a drive mechanism to accommodate test objects of different body types, the obstacle is selectively connected to a surface of the footprint signal modules, and the movable partition is selectively connected to a surface of the footprint signal modules; and
  a control device electrically connected to the footprint signal modules, the drive mechanism, the obstacle, and the movable partition, respectively;
  the method comprises:
  in response to user input or a preset program, controlling the drive mechanism via the control device to automatically adjust the spacing between at least two opposite side panels of the testing enclosure to accommodate the body type of a test object;
  receiving signals acquired from the footprint signal modules by the control device; and
  obtaining animal gait analysis results by the control device controlling the spacing between the side panels, the state of the obstacle, and the state of the movable partition based on the received signals.

The above aspects or examples and advantages, as well as other aspects or examples and advantages, will become apparent from the ensuing description and accompanying drawings.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

Figure 1:
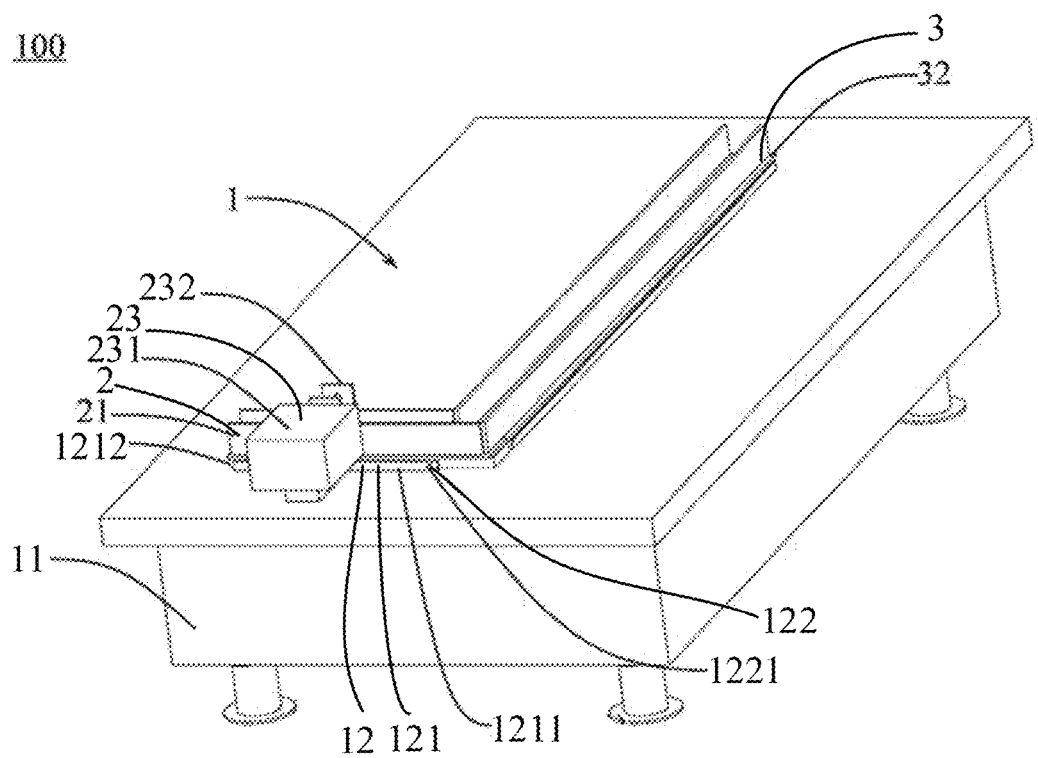
FIG. 1 is a schematic diagram of the overall structure of an animal gait analysis apparatus according to an embodiment of the present application.

Reference Numbers: animal gait analysis apparatus 100; base 11; first module interface 12; first positioning structure 121; guide rail 1211; slider 1212; first locking structure 122; locking pin 1221; first electrical interface 123; preset electrical connector 1231; fixed connector 1232; testing enclosure 2; side panel 21; adjustment structure 23; drive structure 231; nut seat 232; footprint signal module 3; substrate 31; capacitive touchscreen 32; surface protection layer 33; second module interface 34; second positioning structure 341; tenon 3411; mortise 3412; second locking structure 342; screw 3421; second electrical interface 343; cylindrical connector 3431; control device 4; obstacle 7; rampway 71; permanent magnet 72; movable partition 8; door panel 81; micro motor 82.

DETAILED DESCRIPTION OF THE EMBODIMENTS

The present disclosure will be further described in detail below with reference to the drawings. A preferred embodiment is described in the drawings. However, the present disclosure can be implemented in many different forms and is not limited to the embodiments described herein. Rather, these embodiments are provided to provide a thorough understanding of the present disclosure. The specific embodiments are only explanations of the present disclosure, and the embodiments are not intended to limit the present disclosure. Rather, various modifications may be made in the details within the scope and range of equivalents of the claims and without departing from the present disclosure.

The present disclosure will be described in more details below with reference to the accompanying drawings and in conjunction with embodiments. The examples are provided for better illustration of the present disclosure and should not limit the scope of the present disclosure. In practice, technicians skilled in the art might make small modifications and/or variations of the present disclosure without departing from the scope or spirit of the present disclosure. For example, features described in part of one embodiment may be used in another to create a new embodiment. It is therefore desirable that the present disclosure encompass such modifications and/or variations falling within the scope of the appended claims and their equivalents.

In the description of the present disclosure, terms like "longitudinal", "transverse", "up", "down", "front", "back", "left", "right", "vertical", "horizontal", "top", "bottom" denote orientation or positional relationships based on those shown in the drawings and are intended for ease of description only, which in no way entails that the present disclosure must be constructed and operated in a particular orientation and therefore cannot be construed as limiting to the present disclosure. Terms like "joint", "attach" and "set" used in the present disclosure should be understood in a broad sense, for example, may indicate a direct connection or indirect connection through intermediate components; and it may be a wired electrical connection, a radio connection, or a wireless communication signal connection. The exact meanings of the above terms may slightly differ and should be derived from the actual situation by technicians skilled in the art accordingly.

Referring to FIGS. 1-5, in this exemplary embodiment, an animal gait analysis apparatus 100, as shown in FIGS. 1-5, primarily serves to provide a controllable walking to accurately capture and analyze gait parameters during animal locomotion. The apparatus mainly comprises a testing platform 1, at least one footprint signal module 3, a testing enclosure 2, and a control device 4, and may optionally include a camera assembly and a behavior guidance device.

The testing platform 1 is the base platform for the entire apparatus. It is typically made of high-strength, high-stability materials, such as a thick aluminum alloy plate or an engineering plastic structure with reinforcing ribs. Its upper surface is flat and used for supporting and fixing other components. The base 11 of testing platform 1 is designed with sufficient weight and a reasonable support structure to ensure the overall stability of the apparatus during experiments, preventing vibrations from affecting data acquisition accuracy. The testing platform 1 is provided with a first module interface 12 for mounting the footprint signal module 3.

The testing enclosure 2 is disposed above the testing platform 1 and is typically enclosed by side panels 21 and an optional top panel, forming a defined channel to guide the animal to walk on the footprint signal module 3. The spacing between the side panels 21 can be adjusted by an adjustment structure 23 to accommodate experimental animals of different body types.

The footprint signal module 3 is the core unit for acquiring gait information. In this embodiment, the footprint signal module 3 may adopt capacitive touchscreen technology. When an animal's foot contacts its surface, it causes a local capacitance change, which is then detected and converted into a footprint signal. The surface of the footprint signal module 3 is typically covered with a wear-resistant, scratch-resistant, and easy-to-clean surface protection layer 33, such as tempered glass or a polycarbonate film. The substrate 31 of the footprint signal module 3 provides support for its internal circuitry and sensing elements. The footprint signal module 3 cooperates with the first module interface 12 on the testing platform 1 through a second module interface 34 at its bottom, enabling quick installation and removal.

The testing enclosure 2 is constructed above the footprint signal module 3, forming a channel that guides the animal to walk along a specific path. The testing enclosure 2 primarily consists of side panel 21 on both sides and an optional top panel. The height of the side panels 21 is set according to the species and size of the experimental animal to prevent the animal from escaping. Their inner surfaces are typically smooth and uniform in color, designed to minimize disturbance and visual stimulation to the animal. The top panel can be transparent for observation and video recording or opaque to control lighting conditions or prevent the animal from jumping out. The spacing between the side panels 21, which is the width of the walking channel, can be adjusted by the adjustment structure 23.

Control device 4 is mainly used to control the operation of various components and for data computation and processing. It typically includes a microprocessor, a data acquisition card, drive control circuitry, a power module, and a human-machine interface. The control device 4 is connected to the footprint signal module 3 through the first electrical interface 123 to receive and process footprint signals and to calculate parameters such as stride length, stride frequency, stride speed, and stance phase duration. Simultaneously, control device 4 can also control the adjustment structure 23 to adjust the walking channel width, control the behavior guidance device (e.g., acoustic, visual, or electrical stimulation units) to guide animal behavior and coordinate with the camera assembly to synchronously record video information.

The camera assembly, such as a high-speed camera, can be mounted above or to the side of the testing enclosure 2 to record the animal's overall posture and limb coordination. Its data can be analyzed synchronously with the footprint signals to provide more comprehensive gait information.

The behavior guidance device can be integrated at the entrance, exit, or side walls of the testing enclosure 2. It guides the animal to walk in a predetermined direction and at a predetermined speed using light spots, sounds, odors, or mild electrical stimulation, thereby improving the controllability of the experiment and the efficiency of data acquisition.

Embodiment 1

Figure 5:
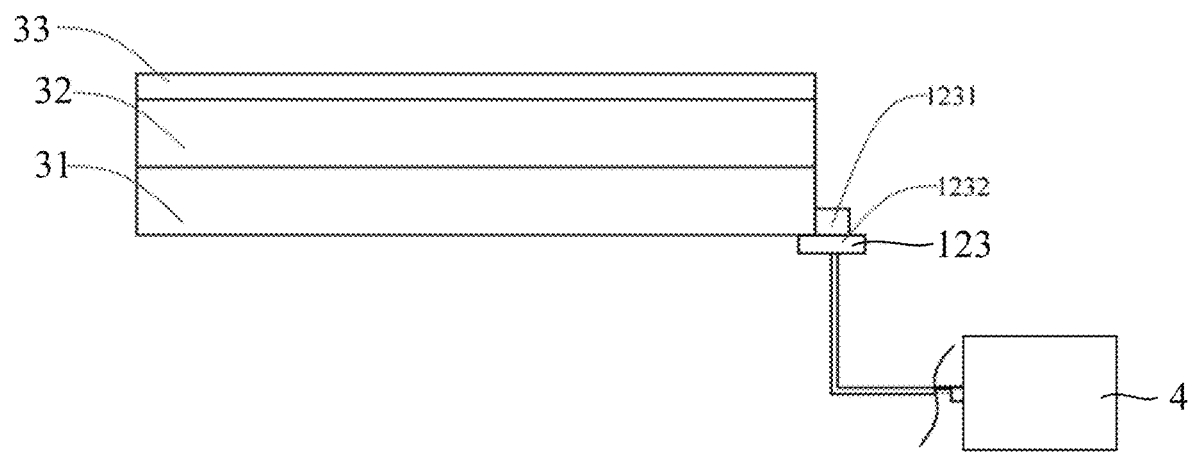
FIG. 5 is a schematic diagram of the cross-sectional structure of a footprint signal module according to an embodiment of the present application.
Figure 6:
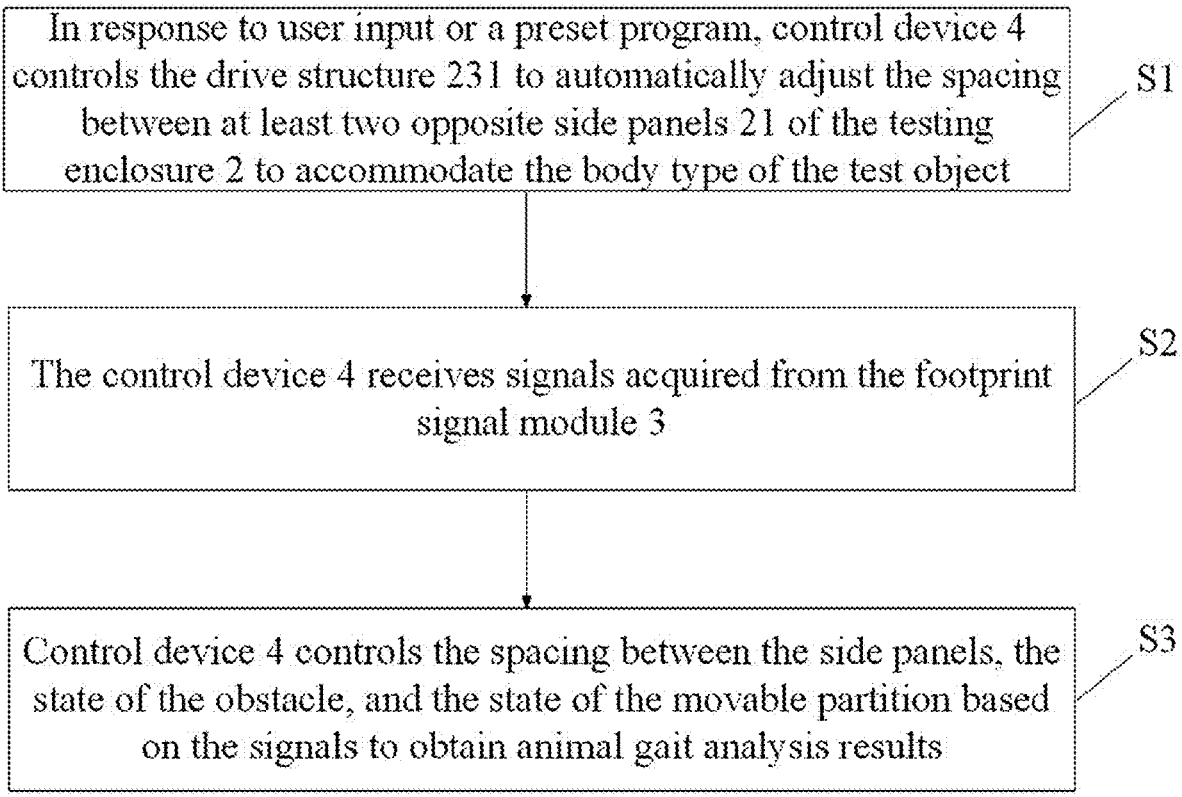
FIG. 6 is a flowchart of an animal gait analysis method according to an embodiment of the present application.

This embodiment primarily describes the universal interface design between the footprint signal module 3 and the testing platform 1, as well as between other optional functional components (such as specific sensor arrays, environmental simulation units, etc., not shown) and the testing platform 1, to achieve rapid assembly, replacement, and maintenance of components. This primarily involves designing the first module interface. The first module interface 12 includes a mechanical connection portion and an electrical connection portion. The mechanical connection portion ensures the stability of component installation and the precision of positioning, while the electrical connection portion is responsible for signal transmission and power supply. The following examples are exemplary:

In this embodiment, as shown in FIGS. 1 and 5, two or more guide rails 1211 (e.g., dovetail guide rails or linear slide rails) are disposed parallel to each other on the testing platform 1. Correspondingly positioned sliders 1212 are provided on the bottom of substrate 31 of the footprint signal module 3. The footprint signal module 3 is inserted by aligning its slider with the guide rail 1211 of the testing platform 1, and the slider 1212 slides within the guide rail 1211 to a predetermined position. At the predetermined position, a locking pin 1221 or a quick-action lever locking mechanism (as part of the first locking structure 122) is provided. After operation, the slider 1212 can be securely and precisely positioned. The guide rail 1211 and the slider 1212 constitute the first positioning structure 121. After the footprint signal module 3 is slid into place, its preset electrical connector 1231 (e.g., a multi-pin connector or a spring pin connector, as part of the first electrical interface 123) on its side or bottom is automatically aligned and engaged with the corresponding fixed connector 1232 on the testing platform 1. This example offers high positioning accuracy and installation stability, making it suitable for components with stringent positioning requirements.

It is understandable that in some embodiments, several (preferably 2 to 4) precision positioning pins (as the first positioning structure 121) are disposed on the testing platform 1, protruding upwards. Corresponding positioning holes are provided at the bottom of substrate 31 of the footprint signal module 3, which precisely matches the positioning pins. During installation, the positioning holes of the footprint signal module 3 are aligned with the positioning pins of the testing platform 1. The module is then lowered, allowing it to be precisely positioned. Locking is achieved by disposing of permanent magnets or electromagnets (as the first locking structure 122) in corresponding areas of the testing platform 1 and substrate 31 of the footprint signal module 3. The components are automatically attracted and fixed when brought close to each other. The electrical connection can be achieved wirelessly (e.g., near-field inductive coupling for power supply and Wi-Fi for data transmission) or by arranging Pogo Pin (spring probe) arrays near the positioning pins/holes and corresponding contact solder pads (as the first electrical interface 123) to achieve electrical conduction after module positioning. This example is extremely simple and fast to operate, requiring no additional tools. Magnetic attraction provides sufficient fixing force, making it suitable for scenarios where components are frequently replaced. Wireless connection avoids wear on physical interfaces.

It is understandable that in some embodiments, the testing platform 1 is provided with mounting slots or mounting areas of standard dimensions, with uniformly specified fixing holes or snap-fit grooves on the edges of these areas. The footprint signal module 3 or other functional components are mounted on a standardized base plate or frame whose dimensions and fixing interfaces match the standard mounting slots or areas on the testing platform 1. The footprint signal module 3 with the standard base plate is placed into the mounting slot of the testing platform 1 and secured by quick-locking screws, lever-type latches (as the first locking structure 122), or toggle latches. The standardized mounting holes and edge profiles constitute the first positioning structure 121. A standardized multi-functional connector (e.g., a D-Sub connector, an aviation plug, or a board-to-board connector, as the first electrical interface 123) is integrated on one side or bottom of the standard mounting area. The corresponding interface of the footprint signal module 3 mates with it after the module is installed in place. This example has strong universality. Modules from different manufacturers and with different functions can be interchanged as long as they adhere to the interface standard, facilitating system upgrades and expansion.

It is understandable that in some embodiments, the edges of the mounting positions on testing platform 1 are provided with clamping arms or grippers (as the first locking structure 122) that can be driven by cylinders or micro-motors. The edge of the substrate 31 of the footprint signal module 3 is designed with features (such as grooves or specific shapes) that cooperate with the clamping. The footprint signal module 3 is placed in the predetermined area of the testing platform 1 (which may be provided with preliminary guiding structures as part of the first positioning structure 121), and then the pneumatic or electric clamping mechanism is activated by the control device 4 to securely clamp the module. Zero Insertion Force (ZIF) connectors or Low Insertion Force (LIF) connectors (as the first electrical interface 123) are used. After the module is placed in position, a lever or slider mechanism (which can be linked to the clamping action) presses the connector contacts to achieve a reliable electrical connection. This example features high automation and a controllable clamping force, making it suitable for scenarios that require remote operation or component replacement in confined spaces. ZIF/LIF connectors have a long lifespan and are easy to plug and unplug.

It is understandable that in some embodiments, a rotary handle or lever with an eccentric wheel (as part of the first locking structure 122) is provided on testing platform 1. The bottom of substrate 31 of the footprint signal module 3 is provided with a pressing surface or a snap-fit structure that cooperates with the eccentric wheel. The footprint signal module 3 is placed in the designated position on testing platform 1 (which can be preliminarily positioned by edge stops or visual markers, serving as the first positioning structure 121), and then the eccentric handle is rotated. The eccentric wheel rotates to securely press or lock the module onto the testing platform 1. A flexible flat cable (FFC) or flexible printed circuit board (FPC) with a connector at its end or a gold finger is led out from the bottom or side of the substrate 31 of the footprint signal module 3. A corresponding FFC/FPC connector socket or spring contact array (as the first electrical interface 123) is provided on testing platform 1 at the corresponding position. After the module is locked, the FFC/FPC is reliably connected. This example offers a large and stable locking force, along with intuitive operation. Flexible circuit connections can accommodate certain installation tolerances and occupy little space.

Through the above examples, the footprint signal module 3 and other functional components can achieve quick and reliable mechanical fixing and electrical connection with the testing platform 1, greatly improving the modularity, maintainability, and experimental setup efficiency of the apparatus.

Embodiment 2

Figure 2:
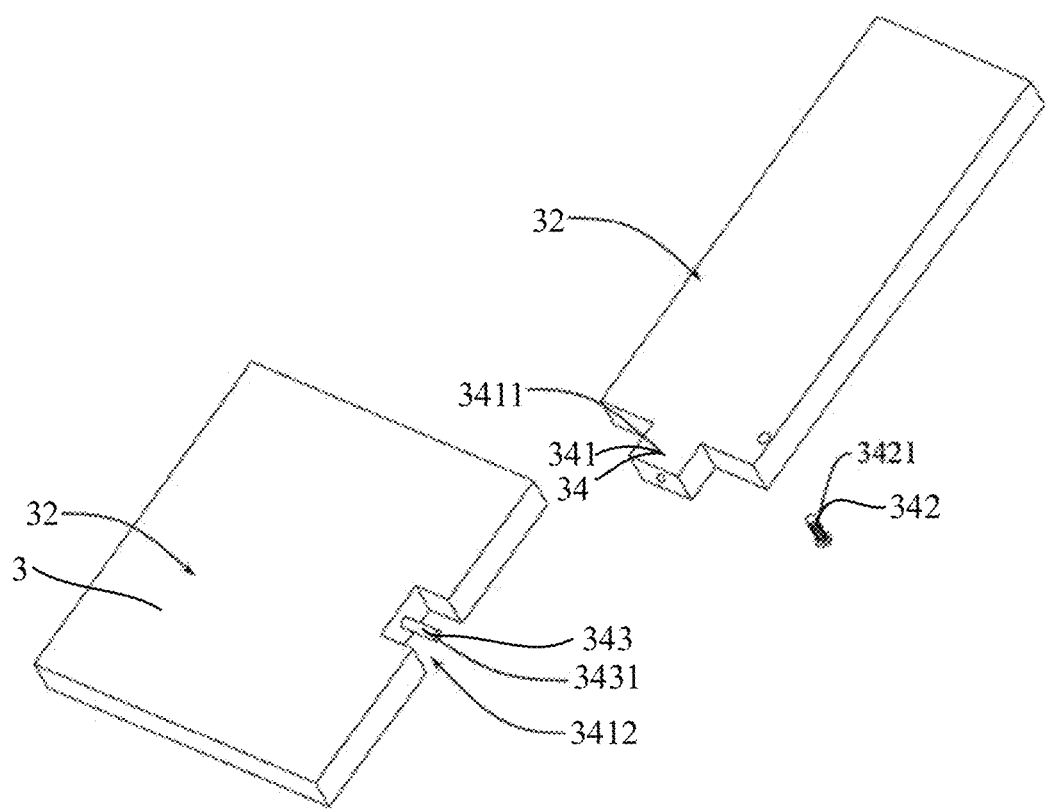
FIG. 2 is a schematic diagram of the structure at the junction of footprint signal modules according to an embodiment of the present application.

This embodiment primarily describes how multiple footprint signal modules 3 are spliced when the animal gait analysis apparatus 100 needs to construct a walking path of a longer or specific shape (e.g., L-shaped, U-shaped. S-shaped). This primarily involves designing the second module interface 34 at the end faces of the footprint signal module 3, which also includes both a mechanical connection portion and an electrical connection portion. The mechanical splicing portion must ensure high alignment precision, a firm connection, and a smooth surface transition between modules. The electrical connection portion must achieve series or parallel power supply and lossless signal transmission, or daisy-chain transfer, between adjacent modules. The following examples are exemplary:

In this embodiment, as shown in FIG. 2, one end of each footprint signal module 3 is designed as a tenon 3411, and the other end is designed as a mortise 3412 (or one side is a flange and the other side is a groove, serving as part of the second positioning structure 341). The dimensions and tolerances of the mortise and tenon structures are precisely machined to ensure that the modules are tightly fitted and automatically aligned when spliced. Further fixation can be achieved after splicing by quick-locking screws 3421 or latches (as part of the second locking structure 342, not separately shown) on the side or bottom of the module. On the side of the splicing end face of the module, near the upper and lower surfaces, a set of or multiple groups of waterproof and dustproof mating connectors (e.g., rectangular connectors or cylindrical connectors 3431, as the second electrical interface 343) are provided. When the modules are mechanically spliced, these connectors are also precisely aligned and plugged in. This example's mortise and tenon structure provides excellent alignment precision and structural strength with a smooth surface transition. Furthermore, the side connectors are less susceptible to contamination from the walking surface.

It is understandable that in some embodiments, strong permanent magnet arrays are embedded in the edge of the splicing end face of each footprint signal module 3. The magnetic poles are carefully arranged so that adjacent modules are automatically attracted and precisely aligned when brought close to each other (the magnetic arrangement itself constitutes the second positioning structure 341 and partially performs the locking function). For enhanced fixing, small manual latches (as the second locking structure 342) can be added. One or more arrays of Pogo Pins (spring probes) (as part of the second electrical interface 343) are provided on the splicing end face of a footprint signal module 3, and corresponding flat conductive solder pads or gold finger areas are provided on the corresponding end faces of adjacent modules. After the modules are magnetically attracted and aligned, the Pogo Pin arrays are compressed, allowing them to come into close contact with the solder pads and establish the electrical connection. This example is extremely fast and convenient for splicing, with self-alignment characteristics, and requires no tools. Pogo Pin connections have good tolerance and reliable contact.

It is understandable that in some embodiments, the edge of the splicing end face of each footprint signal module 3 is machined into a dovetail tenon (or T-shaped male tenon), and the corresponding end face of the adjacent module is machined into a dovetail groove (or T-shaped female groove, constituting the second positioning structure 341). During splicing, the tenon of one module is slid axially into the groove of the other module. After sliding into place, it can be prevented from sliding out by lateral stop screws or spring pins (as the second locking structure 342). Near the edge of the splicing end face of the module (e.g., near the upper or lower surface), a card-edge connector or a board-to-board connector (as the second electrical interface 343) is integrated. When the module slides into place, the male and female parts of the connector engage. This example provides a very firm connection and can withstand certain lateral forces. It is suitable for longer paths requiring high structural integrity.

It is understandable that in some embodiments, standardized screw holes or snap-fit grooves are provided near the splicing end faces of each footprint signal module 3. Connecting rods or connecting plates (whose ends respectively correspond to the interface features of the two modules) are used to fix and connect adjacent modules using bolts or quick latches. The connecting rods/plates themselves also have positioning features (such as pins) to ensure alignment (constituting the second positioning structure 341 and the second locking structure 342). A short flexible flat cable (FFC) or flexible printed circuit board (FPC) with a connector is led out from the end face of each footprint signal module 3. After splicing adjacent modules, their FFC/FPC connectors are mated with each other or bridged through a bi-directional FFC/FPC adapter board, which constitutes the second electrical interface (343). This example has lower processing precision requirements for the modules themselves, relying mainly on the connecting components to ensure precision. Flexible cable bridging can effectively absorb minor displacements and angular deviations between modules, facilitating inspection and maintenance.

It will be understood that, in some embodiments, the splicing end face of each footprint signal module 3 contains several (e.g., 2-4) connecting pins that can be driven by internal micro-actuators (such as shape memory alloy wires or micro airbags) to achieve radial expansion or axial extension. During splicing, modules are aligned (which can be achieved by simple convex and concave features of the module's outer shell, serving as part of the second positioning structure 341). Then, the actuators are activated, causing the connecting pins to expand or extend, tightly engaging with corresponding holes or sleeves in the end faces of adjacent modules for locking (constituting the second locking structure 342). Power can be conducted through metal contact points provided on the module end faces. The signal transmission uses integrated short-range wireless communication units (e.g., Ultra-Wideband UWB) or micro-optical fiber transceivers within the modules, establishing a data bus connection between modules through pre-reserved wireless windows or optical fiber alignment interfaces (as the second electrical interface 343) on end faces. This example allows for semi-automated or fully automated connection and disconnection. Wireless or optical fiber data transmission eliminates wear and oxidation of electrical contacts, offering high signal transmission rates and robust anti-interference capabilities.

Through the above second module interface 34 examples, multiple footprint signal modules 3 can be easily spliced into walking paths of any length and specific curved shapes (e.g., by designing splicing end faces with specific angles or using L-shaped, U-shaped, or S-shaped adapter modules), greatly expanding the experimental scenarios and research scope.

Embodiment 3

This embodiment primarily describes how the width between the side panels 21 of the testing enclosure 2 can be automatically adjusted according to the body type of the experimental animal. This mainly involves the design of the adjustment structure 23 and its cooperative operation with the control device 4. The primary goal is to provide a walking space that prevents small animals from freely turning in excessively wide channels while also accommodating larger animals comfortably. The adjustment structure 23 typically includes a drive portion, a transmission portion, and a guiding portion. The following examples are exemplary:

In this embodiment, as shown in FIG. 1, a precision ball screw or trapezoidal screw (not shown) is installed on testing platform 1, parallel to the direction of the walking path. The screw is driven by a drive mechanism 231 (stepper motor or servo motor) through a coupling or a synchronous belt. Each of the two side panels 21 is connected to the screw through a nut seat 232 and is mounted on linear guide rails (not shown) to ensure smooth movement. Control device 4 calculates a suitable channel width based on user-input animal type or size information or parameters obtained from a connected animal size recognition unit (such as a small 3D scanner or image analysis module). Then, the control device 4 drives the stepper motor to rotate. The screw rotation drives the two side panels 21 to move towards or away from each other until the target width is reached. This example offers high adjustment accuracy, smooth motion, and strong load capacity, suitable for scenarios requiring precise control of channel width.

It is understandable that in some embodiments, a single, higher-power motor drives a central shaft. Gears are mounted on both ends of the shaft and mesh with racks fixed to the bottom of the respective side panels 21. Motor rotation drives the central shaft and gears to rotate, thereby causing the two side panels 21 to move synchronously towards or away from each other. Control device 4 controls the single motor to rotate a specific angle or number of turns, transmitting motion to the side panels 21 through the transmission mechanism to achieve width adjustment. Limit switches or encoders are typically required to accurately control the travel. This example has a relatively simple and direct structure and lower cost.

It is understandable that in some embodiments, a single, higher-power motor drives a crank-slider mechanism or a parallelogram linkage mechanism. The two output ends of this mechanism are connected to the respective side panels 21. Motor rotation achieves synchronous opening and closing of the side panels 21 through the geometric motion of the linkages. Control device 4 controls the single motor to rotate a specific angle or number of turns, transmitting motion to the side panels 21 through the transmission mechanism to achieve width adjustment. Limit switches or encoders are typically required to accurately control the travel. This example has a relatively simple structure and lower cost, and specific motion curves can be achieved through design.

It is understandable that in some embodiments, the bottom or side of the side panel 21 is connected to the piston rod of one or more small cylinders or hydraulic cylinders. The cylinder body is fixed on the testing platform 1. Control device 4 controls the flow and volume of gas or liquid to each cylinder/hydraulic cylinder through solenoid valves. By precisely controlling the extension length of the cylinders/hydraulic cylinders, the position of the side panels 21 can be adjusted. Proportional valves and displacement sensors (such as linear potentiometers or magnetostrictive displacement sensors) can be used to form a closed-loop control system for precise width settings. This example offers a fast response and large output force, suitable for situations requiring quick adjustment or a certain clamping force on the side panels.

It is understandable that in some embodiments, the bottom of the side panels 21 is fixedly connected to both ends of one or more high-strength flexible drive belts (e.g., steel belts or reinforced rubber synchronous belts). The middle of the drive belt is wound around a drum driven by a motor, or the drive belt forms a closed loop driven by a friction wheel or sprocket driven by a motor. Control device 4 controls the motor to rotate forward or in reverse, winding or releasing the drive belt, or the drive wheel drives the closed-loop drive belt to circulate, thereby causing the side panels 21 connected to the drive belt to move synchronously. This example has a compact structure and low noise. It is suitable for compact designs where space is a concern.

It is understandable that in some embodiments, multiple segments of SMA wires or EAP film actuators are integrated into the support structure of the side panels 21. These actuators deform (elongate or contract) when energized or when the temperature changes. Control device 4 achieves precise fine adjustment of the side panel 21 position by accurately controlling the current or voltage applied to the SMA or EAP actuators. By arranging multiple such micro-actuation units in an array or connecting them in series, fine adjustment of the side panel positions can be achieved. This example is more suitable for fine-tuning after the basic width setting or for flexible self-adaptive adjustment to accommodate minor pressure variations generated by the animal's locomotion. It has no moving parts, is noiseless, compact, and responds quickly. It is particularly suitable for precision fine-tuning or flexible adaptation requirements.

It is understandable that in some embodiments, the drive mechanism further comprises a position sensor connected to the slider or the motor, the position sensor configured to provide a feedback signal of the side panel position to the control device to achieve closed-loop control.

Through the above examples, the automatic and precise adjustment of the walking channel width of the testing enclosure 2 can be achieved, thereby improving the universality of the apparatus for animals of different body types and the efficiency of experiments.

Embodiment 4

Figure 3:
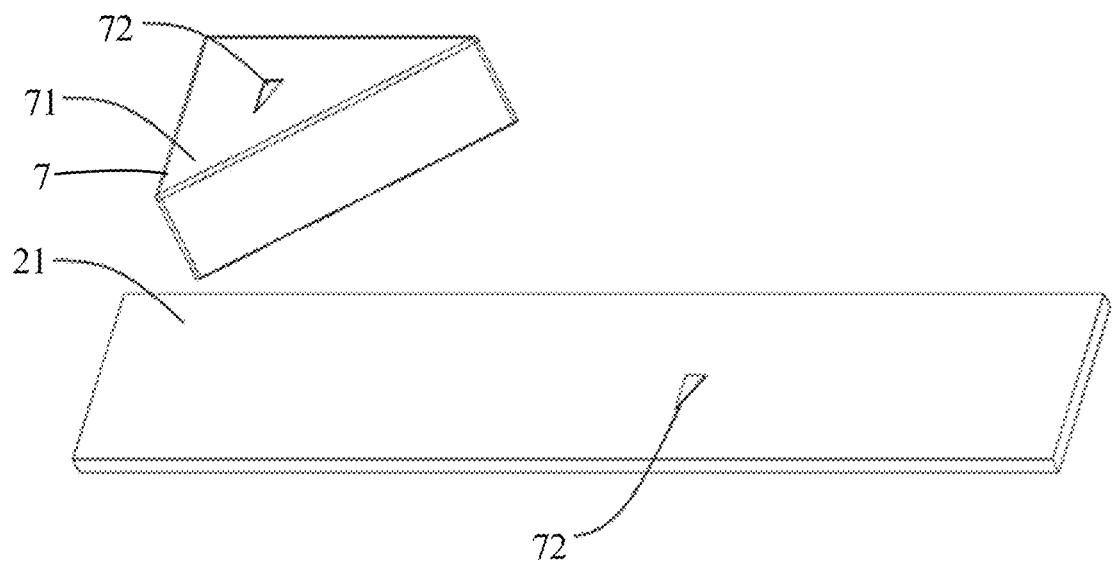
FIG. 3 is a schematic diagram of the structure of the fixing method of an obstacle and a footprint signal module according to an embodiment of the present application.

This embodiment primarily describes how to conveniently set and remove different types of obstacles 7 within the walking path of the testing enclosure 2 for studying animal obstacle avoidance behavior, learning ability, or adaptation to environmental changes. The design of the obstacle 7 should consider ease of installation, stability, and safety for the animal. Obstacle 7 can be fixed to the upper surface of the footprint signal module 3, the inner wall of the side panels 21 of the testing enclosure 2, or the top panel (if provided). The following examples are exemplary:

In this embodiment, as shown in FIG. 3, the bottom or mounting surface of obstacle 7 (e.g., a small cylinder, a low wall, a rampway 71, etc.) is embedded with permanent magnets 72 or ferromagnetic material pieces. Ferromagnetic material regions or another set of permanent magnets 72 are preset at corresponding positions below the surface protection layer 33 of the footprint signal module 3 or on the inner wall of the side panels 21. When the obstacle 7 module is placed in the predetermined position, it can be automatically attracted and fixed by magnetic force. It can be removed by simply pulling it up. This example allows for extremely convenient and quick installation and removal, requiring no tools and enabling flexible changes in the position and combination of obstacles 7.

It is understandable that in some embodiments, several standard-sized card slots (e.g., T-slots or dovetail slots) are machined along the walking path direction or transversely on the upper surface of the footprint signal module 3 or the inner wall of the side panel 21. The bottom of obstacle 7 is designed with a card-joining structure (e.g., a T-block or dovetail tenon) that matches the card slot. The obstacle 7 is fixed by sliding or pressing its card-joining structure into the card slot. Some designs may include elastic latches to prevent accidental detachment. This example provides firm fixing and accurate positioning, capable of withstanding certain impact forces. It is suitable for experiments requiring precise placement of obstacles 7.

It is understandable that in some embodiments, the upper surface of the footprint signal module 3 (or a replaceable grid plate covered on it) is designed with standard-spaced hole arrays. The bottom of obstacle 7 (e.g., posts, partition walls) is provided with pins or protrusions that match the hole array. The obstacle 7 is fixed by inserting its pins into the holes of the grid plate. Various complex shapes of obstacles can be flexibly combined. This example offers extremely high combination freedom, allowing for the creation of very diverse obstacle environments. It is suitable for exploratory research or simulating complex terrain.

It is understandable that in some embodiments, some obstacles 7 (e.g., cylinders, baffles) are driven by micro servo motors or stepper motors and installed below the footprint signal module 3 or in the interlayer of the side panel 21. These obstacles 7 can be controlled by the control device 4 to be raised into the walking path or retracted/rotated away from the path as needed during the experiment. Control device 4 controls the action of the motors according to a preset program or external trigger signals (e.g., when the animal reaches a specific position), causing obstacle 7 to appear or disappear dynamically. This example can achieve a dynamic presentation of obstacle 7 for studying animal reaction times, decision-making processes, or adaptive learning.

Through the above examples, various static or dynamic obstacles 7 can be conveniently introduced within testing enclosure 2, enriching experimental designs and expanding the application scope of animal gait analysis.

Embodiment 5

Figure 4:
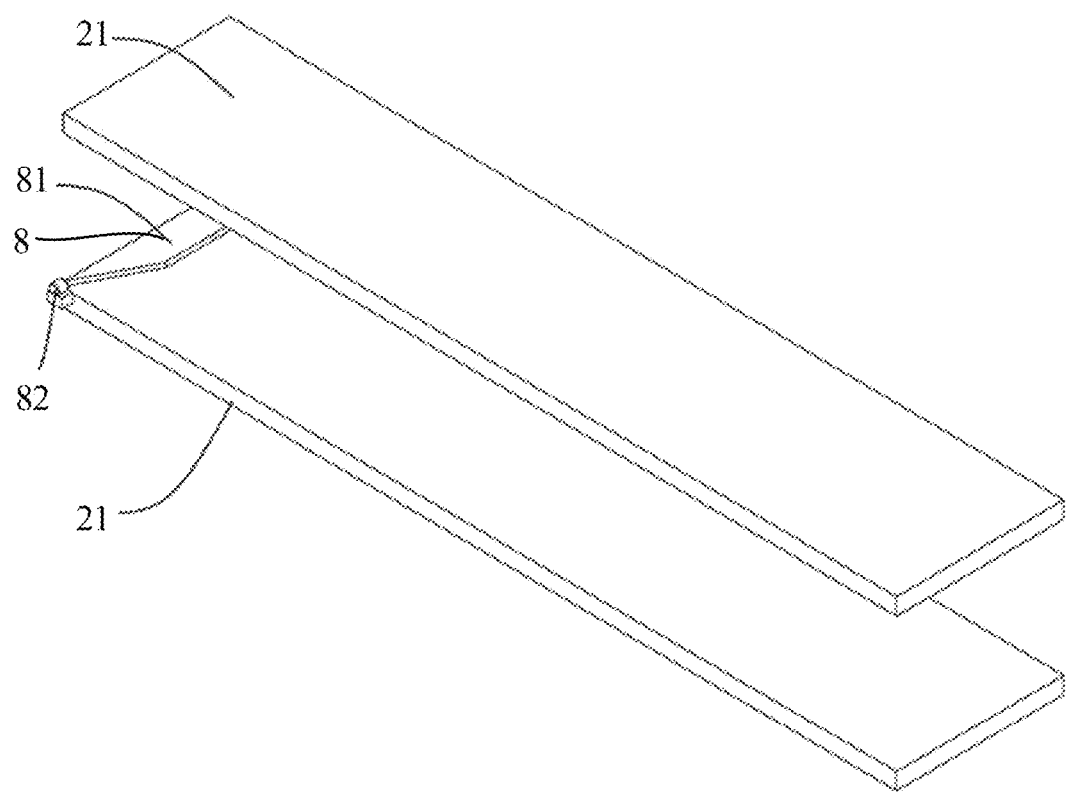
FIG. 4 is a schematic diagram of the structure of a movable partition according to an embodiment of the present application.

This embodiment further elaborates on how to achieve dynamic, programmatic reconfiguration of the walking path itself, based on the previously described embodiment of detachable obstacles 7. This typically involves installing controllable gates, partitions, or path selection points within the walking path, with the control device 4 automatically altering the topology of the channel according to the experimental design. The purpose of dynamically reconfigurable paths is to create complex maze tasks, Y-shaped or T-shaped choice tasks, or to change path continuity during the experiment in order to study animal spatial learning, memory, decision-making, and path planning abilities. The following examples are exemplary:

In this embodiment, as shown in FIG. 4, small gate panels 81 driven by micro-motors 82 (servo motors or stepper motors) are installed at specific nodes of the walking path (e.g., at T-junctions or cross-intersections or in the middle of the channel). Gate panels 81 can rotate around an axis to open/close specific paths or translate along guide rails to open/block passages. Control device 4 controls the action of the corresponding motors according to a preset experimental workflow (e.g., changing the open state of the next accessible path after the animal completes one trial) or real-time sensor information (e.g., if the animal stays in a certain area for too long), thereby reconfiguring the path. This example can precisely control the continuity of the path and implement classic maze tasks (e.g., simplified versions of the Barnes maze or radial arm maze).

It is understandable that in some embodiments, small cylinders or electromagnetic push-pull rods are embedded in the side walls or bottom of the channel, with light baffles attached to their ends. Control device 4 controls the electromagnetic valves to fill/empty the cylinders with gas or to energize/de-energize the electromagnetic push-pull rods, causing the baffles to quickly extend into the channel to form an obstruction or retract into the side walls/bottom to open the passage. By combining multiple such baffles, the path continuity can be flexibly altered. This example offers a fast response and decisive action. It is suitable for experiments requiring rapid changes in path states.

It is understandable that in some embodiments, the side panels 21 or partial partitions of the walking channel are made of transparent materials (e.g., glass or polymer plates), whose inner surfaces are coated with electro-controllable transparency films, such as Polymer Dispersed Liquid Crystal (PDLC) films or electrochromic films. Control device 4 applies or removes voltage to change the transparency of specific areas of the film from transparent to opaque (forming a visual barrier or "wall") or vice versa. In this way, the perceived path layout can be dynamically changed without altering the physical structure. This example eliminates the need for mechanical movement, is quiet, and changes rapidly. It can be used to study the role of visual cues in path selection or to create dynamically changing visual mazes.

It is understandable that in some embodiments, standard Y-shaped, T-shaped, or cross-shaped splittable footprint signal modules 3 are designed (their splicing method can refer to Embodiment 2). At the entrance or exit of these branching/merging modules, small gates, gate panels, or dynamic partitions, as in Embodiment 5, are integrated. By splicing these special path modules, complex path networks with multiple branch points can be pre-constructed. Then, control device 4 controls the open/closed states of the integrated gates/baffles within these modules to dynamically select which branches are open and which are closed. This example combines the flexibility of modular splicing with the real-time nature of dynamic control, allowing for the construction of very complex and dynamically changeable path networks.

It is understandable that in some embodiments, at certain nodes of the walking path, the footprint signal module 3 itself (or a small section of it) is designed as a platform that can be slightly lifted or lowered as a whole, driven by a micro screw mechanism or a scissor lift mechanism. When the platform is raised, its surface is flush with the main path, and the animal can pass normally. When the platform is lowered by a certain distance (e.g., a few millimeters to one centimeter), its surface is below the main path, forming a "cliff" or a step that prevents the animal from passing in that direction or guides the animal to another lower layer of the path that docks with the lowered platform (if multi-layer paths are designed). Control device 4 controls the lifting and lowering of the platform to switch paths. This example can achieve physical blocking of paths or layer switching, increasing the complexity and challenge of the paths.

Through the above examples, the dynamic reconfigurability of the walking channel can be achieved, providing a powerful tool for studying animal behavior in complex and changing environments.

The working process of the animal gait analysis apparatus 100 provided by the present application is generally as follows:

Experimental Preparation:

Based on experimental requirements and animal body type, select and install one or more footprint signal modules 3 onto the testing platform 1. If multiple modules 3 are used, splice them together according to the method in Embodiment 2 to form the desired walking path (straight, L-shaped, U-shaped, etc.).

Control device 4 automatically adjusts the spacing of the side panels 21 of the testing enclosure 2 via the adjustment structure 23 (as in Embodiment 3) to accommodate the test animal's body type.

According to the experimental design, deploy detachable obstacles 7 (as described in Embodiment 4) within the walking path or configure dynamic path reconfiguration units (as described in Embodiment 5).

Calibrate the camera assembly and the behavior guidance device (if used).

Data Acquisition:

Place the experimental animal at the starting end of the walking path.

Start the control device 4 to initiate the experiment. The behavior guidance device can guide the animal's walking as needed.

As the animal walks on the footprint signal module 3, its feet contact the capacitive touchscreen 32, generating capacitance change signals. These raw signals are collected by the footprint signal module 3 and transmitted to the control device 4 through the first electrical interface 123 (and possibly the second electrical interface 343 if multiple footprint signal module 3 are spliced).

Simultaneously, the camera assembly can synchronously record the animal's motion video.

If obstacle 7 or path reconfigurations are set up, control device 4 controls the action of the relevant units according to preset programs or real-time feedback.

Data Processing and Analysis:

Control device 4 performs filtering, denoising, footprint recognition (distinguishing left/right feet, front/hind feet), and calculates footprint parameters (such as stride length, stride width, stance phase duration, swing phase duration, stride frequency, stride speed, footprint area, center of pressure trajectory, etc.) on the received footprint signals.

In conjunction with video data (if acquired), more detailed kinematic analysis and ethological scoring can be performed.

The analysis results can be displayed in real-time on the human-machine interface of the control device 4 and stored as data files for subsequent statistical analysis.

Embodiment 6

This embodiment provides an animal gait analysis method, which is applied to the aforementioned animal gait analysis apparatus 100. Specifically, this method is executed by the control device 4 of the animal gait analysis apparatus 100 and includes the following steps:

S1: In response to user input or a preset program, control device 4 controls the drive structure 231 to automatically adjust the spacing between at least two opposite side panels 21 of the testing enclosure 2 to accommodate the body type of the test object.

For example, control device 4 can automatically adjust the spacing between side panels 21 based on user input information or preset program code. Exemplarily, the user inputs information such as the type of test object (e.g., mouse, rat), strain, body weight, or body length through the human-machine interface of the control device 4 (e.g., a touchscreen or connected computer software). In response to the user input information, control device 4 controls the drive structure 231 to automatically adjust the spacing between at least two opposite side panels 21 of the testing enclosure 2 to accommodate the test object's body type.

S2: The control device 4 receives signals acquired from the footprint signal module 3.

For example, when the test object moves on a walking path composed of one or more footprint signal modules 3, the control device 4 continuously receives raw footprint contact signals transmitted by these modules through the first electrical interface 123 (and possibly the second electrical interface 342). The microprocessor unit within the control device 4 runs preset gait analysis algorithms. These algorithms first filter and preprocess the raw signals to eliminate noise, then identify valid individual footprint spots through methods such as threshold segmentation and connected component analysis and extract basic data such as the spatial-temporal coordinates and contact area of each footprint, as well as pressure distribution (if supported by the sensors). Subsequently, the algorithm tracks continuous footprint sequences, distinguishes left and right feet and front and hind feet, and, based on these identified footprints, calculates a series of key animal gait parameters, including but not limited to stride length (distance between two consecutive landings of the same foot), stride width (lateral distance between left and right feet), stance phase duration, swing phase duration, stride frequency (number of steps per unit time), stride speed (distance traveled per unit time), limb coordination parameters (such as landing order, rhythm index), and center of pressure trajectory of the foot. Finally, control device 4 integrates these calculated gait parameters to form structured gait analysis results, which can be displayed in real-time on the human-machine interface or stored as data files for subsequent statistical evaluation and scientific research.

S3: Control device 4 controls the spacing between the side panels, the state of the obstacle, and the state of the movable partition based on the signals to obtain animal gait analysis results.

For example, although the initial channel width is set according to the animal's body type, in some experiments (e.g., studying animals in narrow spaces or under stress), it is necessary to make minor, dynamic adjustments to the width based on the animal's current locomotion posture or its proximity to the side panels. To this end, control device 4 continuously receives and analyzes data transmitted from the footprint signal module 3 in real-time, calculating the centerline trajectory of the test object's body and its instantaneous distance to the side panels 21 from its limbs (especially the lateral feet). This can be achieved by analyzing the position and width of the footprints and in combination with optional lateral proximity sensors (e.g., infrared ranging sensors installed on the inner walls of the side panels). If control device 4 detects that the animal frequently brushes against one side panel during locomotion, or if its gait pattern indicates unnatural twisting due to an overly narrow channel, control device 4 can activate the drive structure to slightly expand that side panel or both side panels outwards (e.g., by a few millimeters), providing slightly more room for the animal and observing whether its gait returns to natural. Conversely, if the experiment aims to study animal behavior in a progressively narrowing channel, the control device 4 can slowly and symmetrically contract the spacing of the side panels as the animal advances until a preset minimum width is reached or the animal exhibits obvious evasive or stopping behavior. All these side panel width adjustments based on real-time behavior, along with the corresponding time points and animal behavior parameters, are recorded.

For example, when studying an animal's reaction to a sudden obstacle, learning obstacle avoidance strategies, or requiring gait comparison with and without obstacles, the control device 4 is used to monitor the animal's position on the walking path. When the animal's footprint sequence indicates that it is about to reach the area of a preset obstacle 7, or when the animal exhibits specific behavior in a certain area (e.g., staying in an area for longer than a threshold time, possibly indicating hesitation or exploration), the obstacle 7 is immediately commanded to change its state, forming an obstacle. The animal's reaction time, avoidance behavior (e.g., circumventing, backing away, jumping), and subsequent gait changes are recorded. If the animal successfully avoids a certain type of obstacle 7 multiple times, the control device 4 can change the timing, speed, or form (if the obstacle itself is variable) of obstacle 7 in the next trial, increasing the task difficulty. Conversely, if the animal fails multiple times, the difficulty can be reduced.

For example, in experiments such as T-maze, Y-maze, Conditioned Place Preference (CPP), or Conditioned Place Aversion (CPA) that require path selection, it is necessary to dynamically change the continuity of the path during the experiment. To this end, the control device 4 precisely tracks the animal's position and direction of movement on the walking path (especially near junctions) using the footprint signal module 3. At the end of the central arm of a Y-shaped or T-shaped maze, when the control device 4 detects that the animal's footprints indicate its head and body are clearly oriented towards a certain branch path, it can immediately command the movable partition 8 (e.g., an electric gate) to close the entrance gate of the other branch path, preventing the animal from turning back or entering the wrong path. After the animal fully enters the selected branch path, the entrance gate of the central path leading to that branch path is closed, forming a one-way passage. In a longer walking path, multiple bypasses or shortcuts controlled by movable partitions 8 can be installed. When the animal triggers a certain condition on the main path (e.g., finds and contacts a target object or stays in a specific area for a sufficient time), the control device 4 can open the movable partition 8 of a bypass that was previously closed, allowing the animal to pass. Thus, this example achieves real-time, programmatic, and interactive reconfiguration of the walking path, greatly expanding the apparatus's application potential in the study of advanced cognitive functions such as learning and memory, decision-making, and spatial cognition.

The animal gait analysis apparatus 100 and analysis method provided by the present application, through the examples described in the above embodiments, achieve the following significant technical effects:

High Modularity and Flexibility: The universal interface design of the footprint signal modules and other functional components, as well as the applicability of the footprint signal modules, allows the apparatus to quickly set up, replace components, expand functions, and construct walking paths of different lengths and shapes according to experimental requirements, greatly enhancing experimental design flexibility.

Broad Animal Adaptability: The automatic adjustment function for the walking channel size allows the same set of apparatus to be conveniently used for animals of different body sizes (e.g., mice, rats, guinea pigs, or even larger animals like rabbits), reducing the cost and space required for preparing multiple sets of equipment for different animals.

Rich Experimental Paradigm Support: The design of internal detachable obstacles 7 and the dynamic reconfigurability of the walking channel enable researchers to easily introduce environmental challenges and set up complex behavioral tasks (e.g., obstacle avoidance, learning, and memory, path selection, etc.), expanding the application domains of gait analysis.

Improved Experimental Efficiency and Data Quality: Quick assembly and automatic adjustment functions reduce experimental preparation time. Standardized modules and interfaces help ensure the consistency and comparability of data acquisition. Precise footprint signal acquisition and rich, configurable environmental factors contribute to obtaining more comprehensive and in-depth animal behavioral data.

Easy Maintenance and Upgrade: The modular design makes troubleshooting and component replacement simple and fast. When new sensing technologies or analysis algorithms emerge, it is also easier to upgrade the system by replacing or adding corresponding modules.

In summary, the animal gait analysis apparatus provided by the present application, through its innovative modular and reconfigurable design, effectively overcomes the shortcomings of the prior art and provides a powerful, flexible, easy-to-use, and widely adaptable experimental platform for research in ethology and related fields.

The embodiments described above are merely examples of the present disclosure, and should not be used to limit the scope of the present disclosure, which may have various modifications and variations made by specialists in the field. Any modification, equivalent replacement or improvement made within the spirits and principles of the present disclosure shall be included in the scope of protection of the present disclosure.

What is claimed is:

1. An animal gait analysis apparatus, comprising:
   a testing platform;
   a plurality of footprint signal modules mechanically connectable end-to-end and electrically connectable to form a walking path of a predetermined configuration;
   a testing enclosure disposed above the walking path, the testing enclosure comprises at least two side panels disposed opposite each other, at least one obstacle, and at least one movable partition, wherein the spacing between the side panels is automatically adjusted by a drive mechanism to accommodate test objects of different body types, the obstacle is selectively connected to a surface of the footprint signal modules, and the movable partition is selectively connected to a surface of the footprint signal modules; and
   a control device electrically connected to the footprint signal modules, the drive mechanism, the obstacle, and the movable partition, respectively, is configured to:
   receive signals acquired from the footprint signal modules;
   control the spacing between the side panels, the state of the obstacle, and the state of the movable partition based on the received signals; and
   obtain animal gait analysis results;
   wherein the drive mechanism comprises a motor, a guide rail disposed on the testing platform, and a slider connected to the side panels and slidable on the guide rail, the slider driven by the motor.

2. The animal gait analysis apparatus according to claim 1, wherein a first module interface includes a first positioning structure and a first locking structure, the first positioning structure configured for precise positioning of the footprint signal modules on the testing platform, and the first locking structure configured for securely locking the footprint signal modules to the testing platform.

3. The animal gait analysis apparatus according to claim 2, wherein any two adjacent footprint signal modules are mechanically connectable and electrically connected via a second module interface to form a walking path of a predetermined length or shape.

4. The animal gait analysis apparatus according to claim 3, wherein the second module interface includes a second positioning structure and a second locking structure disposed on connecting end faces of the footprint signal modules, and a second electrical interface for signal and power transmission between the two adjacent footprint signal modules, the second positioning structure configured for precise positioning between the two adjacent footprint signal modules, and the second locking structure configured for securing the two adjacent footprint signal modules together.

5. The animal gait analysis apparatus according to claim 1, wherein the at least one obstacle that is removable is disposed inside the testing enclosure, the at least one obstacle secured to the surface of the footprint signal modules or an inner wall of the side panels by a snap-fit, magnetic, or screw-thread connection.

6. The animal gait analysis apparatus according to claim 5, wherein the obstacle is at least one of a cylinder, a rampway, or a module with a replaceable textured surface.

7. The animal gait analysis apparatus according to claim 1, wherein the testing enclosure comprises a plurality of independently controllable movable partitions, the movable partitions driven by the control device to form variable channel branches or enclosed areas within the walking path to achieve dynamic reconfiguration of the walking path.

8. An animal gait analysis method, applied in an animal gait analysis apparatus comprising:
   a testing platform;
   a plurality of footprint signal modules mechanically connectable end-to-end and electrically connectable to form a walking path of a predetermined configuration;
   a testing enclosure disposed above the walking path, the testing enclosure comprises at least two side panels disposed opposite each other, at least one obstacle, and at least one movable partition, wherein the spacing between the side panels is automatically adjusted by a drive mechanism to accommodate test objects of different body types, the obstacle is selectively connected to a surface of the footprint signal modules, and the movable partition selectively connectable to a surface of the footprint signal modules; and
   a control device electrically connected to the footprint signal modules, the drive mechanism, the obstacle, and the movable partition, respectively;
   wherein the drive mechanism comprises a motor, a guide rail disposed on the testing platform, and a slider connected to the side panels and slidable on the guide rail, the slider driven by the motor;
   the method comprises:
   in response to user input or a preset program, controlling the drive mechanism via the control device to automatically adjust the spacing between at least two opposite side panels of the testing enclosure to accommodate the body type of a test object;
   receiving signals acquired from the footprint signal modules by the control device; and
   obtaining animal gait analysis results by the control device controlling the spacing between the side panels, the state of the obstacle, and the state of the movable partition based on the received signals.

* * * * *